United States Patent Office 3,084,141
Patented Apr. 2, 1963

3,084,141
METHOD OF CURING POLYMERIC MATERIALS AND THE PRODUCT THEREOF
Gerard Kraus and Jerry T. Gruver, Bartlesville, Okla., assignors to Phillips Petroleum Company, a corporation of Delaware
No Drawing. Filed Apr. 25, 1960, Ser. No. 24,212
22 Claims. (Cl. 260—85.1)

This invention relates to a method of curing polymeric materials. In another aspect it relates to the process of reacting polymeric materials with an improved curing system. In still another aspect this invention relates to the resulting cured products of this process.

Many polymeric materials, particularly the unsaturated rubbery polymers, require a curing or cross linking treatment to place them in a useful condition. In addition, other polymers such as polyethylene or polypropylene can be improved in certain properties, i.e. thermal stability, by cross linking. Several chemical curatives are well known and are in commercial use. Each has its peculiar advantages but frequently gains made in one property of the polymer are at the expense of another property.

We have discovered two classes of chemical curatives which when used together in polymeric materials produce a cumulative effect that is superior to the sum of the effects of each curative used individually. In other words we have found an unexpected synergism to exist in the combined action of two entirely different types of chemicals on the properties of polymeric materials. Our invention, therefore, resides in the method of curing or treating certain polymers by reacting them with two materials in combination. These materials are (1) organic peroxides and (2) polyisocyanates. The polymers curable with this system include natural rubber and synthetic polymers of monomers containing a vinylidene group. The invention is especially valuable in curing synthetic polymers having the formula $AY_n$ where A comprises a polymer of monomers containing a vinylidene group, Y is a hydroxy group, and $n$ is an integer of 1 or more, preferably at least 2 and generally 2, 3, or 4.

It is an object of our invention to provide a method of curing polymeric materials with an improved curing system.

It is another object of our invention to provide a process wherein a polymeric material can be reacted with two different curatives to produce an improvement in physical properties of the material.

Another object is to provide a polymeric material having improved physical properties as a result of having been reacted with an improved two-component curing system.

Other objects, advantages and features of our invention will become apparent to those skilled in the art from the following discussion.

The materials which can be treated for improvements in properties according to our invention are natural rubber and polymers of vinylidene compounds which are polymerizable to high molecular weights. Included among these polymers are homopolymers of conjugated dienes having from 4 to 12 carbon atoms, preferably the conjugated dienes having 4 to 8 carbon atoms per molecule such as 1,3-butadiene, isoprene, piperylene, methylpentadiene, 2-methyl-1,3-hexadiene, phenylbutadiene 3,4-dimethyl-1,3-hexadiene, 4,5-diethyl-1,3-octadiene, fluoroprene, chloroprene, and the like. Among these butadiene, isoprene and piperylene are preferred. In addition, suitable materials include copolymers of the above-mentioned conjugated dienes with compounds containing a vinylidene group, such as isobutylene, styrene, p-methoxystyrene, vinylnaphthalene, vinyltoluene, heterocyclic nitrogen-containing monomers such as pyridine and quinoline derivatives containing at least one vinyl or alpha-methylvinyl group, such as 2-vinylpyridine and 2-methyl-5-vinylpyridine, acrylic and alkacrylic acid esters, such as methyl acrylate, ethyl acrylate, and methyl methacrylate, methyl vinyl ether, vinyl chloride, vinylidene chloride, and the like. Polymers containing acidic groups along the polymer chain, such as polymers of acrylic acid or methacrylic acid, can be cured with our system. Our curing system can also be used to treat polymers of monoolefins having 2 to 8 carbon atoms such as polyethylene, polypropylene, polybutene, copolymers of ethylene with propylene or 1-butene, and the like. These synthetic polymers of monomers containing a vinylidene group ($H_2C{=}C{<}$) can be made by a number of well known processes. Emulsion polymerization of butadiene and vinylidene-containing monomers such as styrene and the vinylpyridines, for example, is a well established process. Mass or solution polymerizations employing various catalyst systems are likewise known methods of preparing polymers of mono- and diolefins, for example, polyethylene, polypropylene, polybutadiene, polyisoprene, and the like.

In addition to the above materials, our process has particular utility in treating terminally reactive polymers containing terminal hydroxy groups. As used herein, the term "terminally reactive polymer" denotes polymer containing a reactive group on both ends of the polymer chain. Polymers containing terminal hydroxy groups can be prepared from polymers containing terminal alkali metal atoms.

The monomers which can be employed in the preparation of polymers containing terminal alkali metal atoms include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, and the like. In addition, conjugated dienes containing reactive substituents along the chain can also be employed, such as for example, halogenated dienes, such as chloroprene, fluoroprene, and the like. Of the conjugated dienes, the preferred material is butadiene, with isoprene and piperylene also being especially suitable. In addition to the conjugated dienes, other vinylidene-containing monomers, preferably containing less than 20 carbon atoms, can be employed; for example, aryl-substituted olefins, such as styrene, and vinylnaphthalene, various alkyl styrenes, such as vinyltoluene, paramethoxystyrene, and the like; heterocyclic nitrogen-containing monomers, such as pyridine and quinoline derivatives containing at least 1 vinyl or alphamethylvinyl group, such as 2-vinylpyridine, 3-vinylpyridine, 4-vinylpyridine, 2-ethyl-5-vinylpyridine, 2-methyl-5-vinylpyridine, 3,5-diethyl-4-vinylpyridine, and the like; similar mono- and disubstituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, and the like.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers in addition to including homopolymers and copolymers of the above materials also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. A detailed description of block copolymers containing terminal reactive groups and their method of preparation is set forth in the copending application of R. P. Zelinski, Serial No. 796,277, filed March 2, 1959.

The terminally reactive polymers are prepared by contacting the monomer or monomers which it is desired to polymerize with an organo polyalkali metal compound. The organo polyalkali metal compounds preferably contain from 2 to 4 alkali metal atoms, and those containing 2 alkali metal atoms are more often employed. As will be explained hereinafter, lithium is the preferred alkali metal.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkali metal atoms being attached at each end of the polymer chain. The polymers in general will be linear polymers having two ends; however, polymers containing more than two ends can be prepared within the scope of the invention. The general reaction can be illustrated graphically as follows:

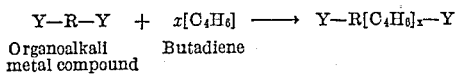

or

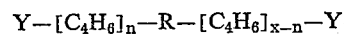

or combinations thereof.

A specific example is:

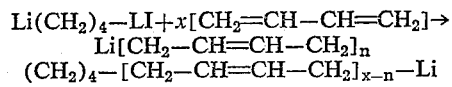

In the specific example, 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkali metals, of course, include sodium, potassium, lithium, rubidium, and cesium. The organic radical of the organo polyalkali metal compound can be an aliphatic, cycloaliphatic or aromatic radical. For example, di- and polyalkali metal substituted hydrocarbons can be employed including 1,4-dilithiobutane, 1,5-dipotassiopentane, 1,4-disodio-2-methylbutane, 1,6-dilithiohexane, 1,10-dilithiodecane, 1,15-dipotassiopentadecane, 1,20-dilithioeicosane, 1,4-disodio-2-butene, 1,4-dilithio-2-methyl-2-butene, 1,4-dilithio-2-butene, 1,4-dipotassio-2-butene, dilithionaphthalene, disodionaphthalene, 4,4'-dilithiobiphenyl, disodiophenanthrene, dilithioanthracene, 1,2-dilithio-1,1-diphenylethane, 1,2-disodio-1,2,3-triphenylpropane, 1,2-dilithio-1,2-diphenylethane, 1,2-dipotassiotriphenylethane, 1,2-dilithiotetraphenylethane, 1,2-dilithio-1-phenyl-1-naphthylethane, 1,2-dilithio-1,2-dinaphthylethane, 1,2 - disodio-1,1-diphenyl-2-naphthylethane, 1,2-dilithiotrinaphthylethane, 1,4-dilithiocyclohexane, 2,4-disodioethylcyclohexane, 3,5-dipotassio-n-butylcyclohexane, 1,3,5-trilithiocyclohexane, 1-lithio-4- (2-lithio-4-methylphenyl)butane, 1,2-dipotassio-3-phenylpropane, 1,2-di(4-lithiobutyl)-benzene, 1,3-dilithio-4-ethylbenzene, 1,4-dirubidiobutane, 1,8-dicesiooctane, 1,5,12-trilithiododecane, 1,4,7-trisodioheptane, 1,4-di(1,2-dilithio-2-phenylethyl)benzene, 1,2,7,8 - tetrasodionaphthalene, 1,4,7,10-tetrapotassiodecane, 1,5-dilithio-3-pentyne, 1,8-disodio-5-octyne, 1,7-dipotassio-4-heptyne, 1,10-dicesio-4-decyne, 1,11-dirubidio-5-hendecyne, 1,2-disodio-1,2-diphenylethane, dilithiophenanthrene, 1,2-dilithiotriphenylethane, dilithiomethane, 1,4-dilithio-1,1,4,4-tetraphenylbutane, 1,4-dilithio-1,4-diphenyl-1,4-dinaphthylbutane, and the like.

While the organo dialkali metal initiators in general can be employed, certain specific initiators give better results than others and are preferred in carrying out the preparation of the terminally reactive polymers. For example, of the condensed ring aromatic compounds, the lithium anthracene adduct is preferred, but the adducts of lithium with naphthalene and biphenyl can be employed with good results. Of the compounds of alkali metals with polyaryl-substituted ethylenes, the preferred material is 1,2-dilithio-1,2-diphenylethane (lithium-stilbene adduct). In many instances, the compounds which are formed are mixtures of mono- and dialkali metal compounds, which are less effective in promoting the formation of the terminally reactive polymers. The organo dialkali metal compounds, which have been set forth as being preferred, are those which when prepared contain a minimum of the monoalkali metal compound.

The amount of initiator which can be used will vary depending on the polymer prepared, and particularly the molecular weight desired. Usually the terminally reactive polymers are liquids, having molecular weights in the range of 1,000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between −100 and +150° C., preferably between −75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymers prepared as hereinbefore set forth contain an alkali metal atom on each end of the polymer chain and the organic radical of the initiator is present in the polymer chain. These polymers can be converted to polymers containing terminal hydroxy groups by reacting with a suitable reactant material such as oxygen or an epoxy compound and subjecting the product to hydrolysis or reaction with a reagent which is capable of replacing the alkali metal atoms with hydrogen atoms. Suitable reagents which can be used include dilute mineral acids, glacial acetic acids, or other organic acids, alcohols or alcohol-water mixtures such as methyl alcohol, ethyl alcohol solution, mixtures of acid and alcohols, and the like. The following reactions in which P is the polymer illustrate the mechanism by which the terminal hydroxy polymers are prepared.

(1) $Li-P-Li + O_2 \longrightarrow Li-O-P-O-Li$ $Li-O-P-O-Li + H_2SO_4 \longrightarrow HO-P-OH + Li_2SO_4$ (2) $Li-P-Li + 2CH_2\underset{O}{-}CH_2 \longrightarrow$ $Li-O-CH_2-CH_2-P-CH_2-CH_2-O-Li$ $Li-O-CH_2-CH_2-P-CH_2-CH_2-O-Li + H_2SO_4 \longrightarrow$ $HO(C_2H_4)P(C_2H_4)OH + Li_2SO_4$ Reaction of the alkali metal containing polymer with oxygen or epoxy compound can be carried out over a wide range of temperatures, for example, from as low as 50° to as high as 250° C. and for a period ranging from 30 minutes to 80 hours or more. A variety of epoxy compounds can be employed including material such as ethylene oxide, propylene oxide, butene oxide, and the like. The amount of oxygen or epoxy compound employed can vary over a wide range. Preferably the minimum amount is that which is sufficient to react with all of the alkali metals in the polymer; however, larger quantities of reactant can be employed if desired.

The polyisocyanates which are applicable include compounds containing two or more —N=C=O groups. Representative polyisocyanates are: benzene-1,3-diisocyanate, benzene-1,4-diisocyanate, hexane-1,6-diisocyanate, toluene-2,4-diisocyanate (tolylene-2,4-diisocyanate), toluene-3,4-diisocyanate, diphenylmethane-4,4'-diisocyanate, naphthalene-1,5-diisocyanate, diphenyl-4,4'-diisocyanate, diphenyl-3,3'-dimethyl-4,4'-diisocyanate, diphenyl-3,3'-dimethoxy-4,4'-diisocyanate, 2,2'-diisocyanate diethylether, 3-(diethylamino)-pentane-1,5-diisocyanate, pentane-1,5-diisocyanate, butane-1,4-diisocyanate, octane-1,8-diisocyanate, ethane diisocyanate, propane-1,2-diisocyanate, cyclohex-4-ene-1,2-diisocyanate, xylylene-1,4-diisocyanate, benzene-1,2,4-triisocyanate, naphthalene-1,3,5,7-tetraisocyanate, triphenylmethane triisocyanate, naphthalene-1,3,7-triisocyanate, and the like.

A suitable commercially available polyaryl polyisocyanate is PAPI 1, a product of Corwin Chemical Company. This material has an average of 3 isocyanate groups per molecule and an average molecular weight of about 380. Its general formula is:

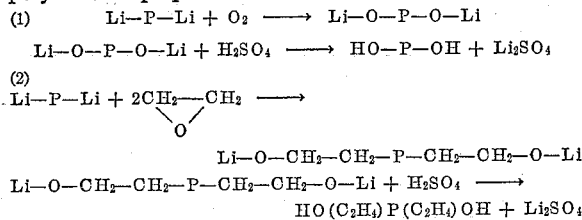

The polyisocyanates can be aliphatic, cycloaliphatic or aromatic compounds. Preferably the polyisocyanates are represented by the general formula $R(NCO)_m$ wherein R is a polyvalent organic radical containing from 2 to 30 carbon atoms and $m$ is 2, 3, or 4. R can be aliphatic, cycloaliphatic or aromatic. Also we prefer that the organic radical be essentially hydrocarbon in character although the presence of unreactive groups containing elements other than carbon and hydrogen is permissible.

The organic peroxides used in the invention have the general formula

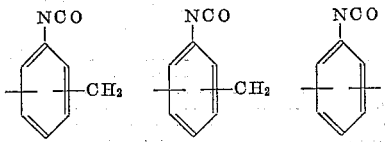

wherein each R' is selected from the group consisting of alkyl, cycloalkyl, aryl, alkaryl, aralkyl and acyl radicals containing from 1 to 15 carbon atoms. Examples of specific suitable organic peroxides include dimethyl peroxide, methyl ethyl peroxide, di-tert-butyl peroxide, di-tert-amyl peroxide, di-n-hexyl peroxide, n-butyl-n-amyl peroxide, dicyclohexyl peroxide, dicyclopentyl peroxide, di(methylcyclohexyl)peroxide, diphenyl peroxide, di-4-tolyl peroxide, di(2,4,6-trimethylphenyl) peroxide, phenyl benzyl peroxide, tert-butyl phenyl peroxide, dibenzoyl peroxide, diacetyl peroxide, dibenzyl peroxide, bis(α-methylbenzyl) peroxide, bis(α-ethylbenzyl) peroxide, bis(α-n-propyl-benzyl) peroxide, bis(α-isopropylbenzyl) peroxide, bis(α,α-dimethylbenzyl) peroxide, bis(α,α-diethylbenzyl) peroxide, bis(α,α-di-n-propylbenzyl) peroxide, bis(α,α-diisopropylbenzyl) peroxide, bis(α-methyl-α-ethylbenzyl) peroxide, bis(α-ethyl-α-isopropylbenzyl) peroxide, bis(α-methyl-α-tert-butylbenzyl) peroxide, bis (α,α-dimethyl-3-methylbenzyl) peroxide, bis (α,α-diethyl-2-ethylbenzyl) peroxide, bis(α-methyl-α-ethyl-3-tert-butylbenzyl) peroxide, bis(α,α-dimethyl-2,4-dimethylbenzyl) peroxide, bis(α,α-dimethyl-4-isopropylbenzyl) peroxide, bis(α,α-diisopropyl-4-ethylbenzyl) peroxide, bis(α-methyl-α-ethyl-4-isopropylbenzyl) peroxide, bis(α,α-dimethyl-4-isopropylbenzyl) peroxide, bis (α,α-diisopropyl-2-ethylbenzyl) peroxide, bis(α,α-dimethyl-4-tert-butylbenzyl) peroxide, bis(α,α-diethyl-4-tert-butylbenzyl) peroxide, benzyl α-methylbenzyl peroxide, benzyl α-methyl-4-methylbenzyl peroxide, benzyl α-methyl-4-isopropylbenzyl peroxide, benzyl α,α-dimethylbenzyl peroxide, benzyl α,α-dimethyl-4-methylbenzyl peroxide, benzyl α,α-dimethyl-4-isopropylbenzyl peroxide, α,α,α'-trimethyldibenzyl peroxide, α-methyl-α,α'-diethyl-α'-n-propyldibenzyl peroxide, α-methyl-α,α',α'-triisopropyldibenzyl peroxide, α,α-dimethyl-α',α'-di-n-butyldibenzyl peroxide, bis[dimethyl(1-naphthyl)methyl] peroxide and bis[diethyl(2-naphthyl)methyl] peroxide.

The amount of organic peroxide used in the curing system depends upon the polymer being treated. Generally, the amount of organic peroxide is in the range of 0.05 to 5 parts by weight per 100 parts of polymer. The amount of organic peroxide can be regulated to obtain a tight or an intermediate cure. The amount of polyisocyanate used is ordinarily in the range of 0.1 to 5 parts by weight per 100 parts of polymer. In order to obtain a good balance of physical properties in the polymer for most conventional uses, we prefer to practice our invention with about 0.1 to 2 parts by weight of peroxide and 0.5 to 3 parts by weight of polyisocyanate per 100 parts of polymer. Ordinarily the ratio, in parts by weight, of polyisocyanate to organic peroxide is at least 1:1 and usually an excess of the polyisocyanate is employed. In some instances, however, an excess of the peroxide is used, i.e., the ratio of polyisocyanate compound to peroxide can be 0.7:1 parts by weight or even lower. In treating polymers containing terminal hydroxy groups, it is preferred that at least a stoichiometric amount of the polyisocyanate be employed but an amount slightly below this can be used, e.g., from 80 or 90 percent stoichiometric to a large excess. It is preferred that the amount range from stoichiometric to a 30 percent excess.

The organic peroxide and polyisocyanate can be incorporated into the polymer in the same manner used to add conventional additives or reactants to rubbery or plastic materials, for example, by combining the materials on a roll mill or in a Banbury mixer. The curing or reacting temperature can vary over a broad range and is generally that used in the rubber art, for example from 200 to 500° F., although the temperature is ordinarily in the range of 260 to 350° F. The time can also vary considerably from a few minutes to several hours, although usually a curing time of from 20 to 150 minutes is used. Various types of compounding ingredients, including fillers, such as carbon blacks or mineral fillers, can be incorporated into the polymeric material if desired.

The invention provides a method for converting liquid, semisolid, and solid polymers to vulcanized rubbery and cross-linked plastic products. A wide variety of polymer compositions which are obtained when operating in accordance with the present invention include materials which are suitable as adhesives, potting compounds, tread stocks, and also for the manufacture of many types of molded objects.

A better understanding of the invention can be gained from the following examples. The specific materials and conditions used are typical only and should not be construed to limit our invention unduly.

*Example I*

A rubbery butadiene-styrene random copolymer was prepared in a 20-gallon reactor in accordance with the following recipe:

| | |
|---|---|
| Butadiene _____ parts by weight__ | 75 |
| Styrene _____ do____ | 25 |
| Toluene _____ do____ | 1000 |
| Tetrahydrofuran (0.1% hydroquinone) ___ do____ | 1.0 |
| n-Butyllithium _____ do____ | 0.20 |
| Shortstop: Water. | |
| Antioxidant: Phenyl-beta-naphthylamine, p.h.r.[1] __ | 2.0 |
| Polymerization temperature, °F. _____ | 86 |

[1] Parts by weight per 100 parts rubber.

Toluene was charged first followed by a nitrogen purge. Styrene was then introduced followed by the tetrahydrofuran, butadiene, and finally the n-butyllithium. Polymerization as effected at 86° F. to 100 percent conversion.

Polymerization grade butadiene which was dried by liquid circulation through a series of silica gel columns was used for the polymerization. Technical grade toluene and polymerization grade styrene were employed after being dried by countercurrent purging with dry nitrogen in a packed column. The n-butyllithium was supplied by Orgmet of Wenham, Massachusetts, as a 1-molar solution in pentane.

At the conclusion of the polymerization, the reaction mixture was pressured into a 60-gallon blowdown tank containing water as a shortstop. The antioxidant, phenyl-beta-naphthylamine, was added as a 2.0 percent solution in toluene. The polymer solution was washed twice with water at room temperature and then steam stripped under vacuum to remove solvent and isolate the polymer which was then dried at 300° F. in an extrusion drier. It had a Mooney value (ML-4 at 212° F.) of 43, an inherent viscosity of 1.33, and was gel free.

The butadiene-styrene copolymer was compounded in accordance with the following recipes:

| | Parts by Weight | | | |
|---|---|---|---|---|
| | 1 | 2 | 3 | 4 |
| Butadiene/styrene copolymer | 100 | 100 | 100 | 100 |
| Philblack O [1] | 50 | 50 | 50 | 50 |
| Dicumyl peroxide [2] | 0.24 | | 0.24 | 0.32 |
| Tolylene-2,4-diisocyanate | | 1 | 1 | 0.8 |

CURED 30 MINUTES AT 307° F.

| | 1 | 2 | 3 | 4 |
|---|---|---|---|---|
| 300% Modulus, p.s.i. | 700 | | 1,010 | 1,410 |
| Tensile, p.s.i. | 1,000 | 130 | 1,550 | 2,080 |
| Elongation, percent | 460 | 120 | 510 | 450 |

CURED 60 MINUTES AT 307° F.

| | 1 | 2 | 3 | 4 |
|---|---|---|---|---|
| 300% Modulus, p.s.i. | 790 | | 1,370 | 1,970 |
| Tensile, p.s.i. | 1,190 | 170 | 2,090 | 2,230 |
| Elongation, percent | 440 | 160 | 460 | 340 |
| Resilience, percent | 62 | 58.9 | 65.6 | 75.9 |
| ΔT, °F. | 112.3 | [3] | [4] | 64.2 |

[1] High abrasion furnace black.
[2] Di-Cup 40° C.: A product containing 40% active dicumyl peroxide and 60% precipitated CaCO3. Amount charged: 0.6 part in runs 1 and 3 and 0.8 part in run 4.
[3] Too soft to determine.
[4] Not measured: imperfect test specimen.

These data demonstrate the synergistic action of the combined curatives. At both cure levels, the modulus and tensile strength of each sample which contained both curatives was much higher than the combined moduli and combined tensile strengths obtained from recipes 1 and 2. The stocks containing the combined curatives also have a higher resilience than the products from either recipe 1 or 2 and the product from recipe 4 shows a noteworthy improvement in heat build-up over the stocks containing either dicumyl peroxide or tolylene-2,4-diisocyanate.

*Example II*

Three butadiene-styrene random copolymers were prepared in accordance with the following recipes:

| | Parts by Weight | | |
|---|---|---|---|
| | 1 | 2 | 3 |
| Butadiene | 77 | 77 | 77 |
| Styrene | 23 | 23 | 23 |
| Cyclohexane | 1,200 | 1,200 | 1,170 |
| 1,2-Dilithio-1,2-diphenylethane | 1.4 mmoles | 1.3 mmoles | 1.2 mmoles |
| Tetrahydrofuran | 1.5 | 1.5 | 1.5 |
| Temperature, °F. | 122 | 122 | 122 |
| Time, hours | 2 | 2.5 | 2 |
| Conversion, percent | quantitative | quantitative | quantitative |
| Inherent viscosity | 1.76 | 1.72 | [1] |
| Mooney (ML-4 at 212° F.) | 42 | 42.8 | 53.5 |

[1] Not determined.

The following recipe was used for preparation of the 1,2-dilithio-1,2-diphenylethane:

| | |
|---|---|
| 1,2-diphenylethylene (trans-stilbene), mole _____ | 0.1 |
| Lithium wire, mole _____ | 0.3 |
| Diethyl ether, ml. _____ | 450 |
| Tetrahydrofuran, ml. _____ | 50 |
| Temperature, °F. _____ | 122 |
| Time, hour _____ | 1 |

The three copolymers were blended using 120 grams of each of the first two and 40 grams of the third. The blend was compounded as follows:

| | Parts by Weight | |
|---|---|---|
| | 1 | 2 |
| Copolymer blend | 100 | 100 |
| Philblack O | 50 | 50 |
| Di-tert-butyl peroxide [1] | 0.225 | 0.225 |
| Tolylene-2,4-diisocyanate | | 1 |

CURED 75 MINUTES AT 307° F.

| | 1 | 2 |
|---|---|---|
| $V_r$ | 0.318 | 0.415 |
| 300% Modulus, p.s.i. | 820 | |
| Tensile, p.s.i. | 1,470 | 2,470 |
| Elongation, percent | 550 | 290 |
| Resilience, percent | 64.1 | 70.7 |
| ΔT, °F. | 108 | 67 |

[1] Material contained 15 percent active peroxide; 1.5 part charged.

A higher tensile strength, higher resilience, and markedly lower heat build-up are obtained with the combined curative.

$V_r$ is the inverse swelling ratio of the polymer in n-heptane, a measure of the cross-link density.

*Example III*

The butadiene/styrene random copolymer described in

Example I was compounded, cured, and evaluated. Details of the runs are shown below:

|  | Parts by Weight | |
|---|---|---|
|  | 1 | 2 |
| Butadiene/styrene copolymer | 100 | 100 |
| Wyex [1] | 50 | 50 |
| Dicumyl peroxide [2] | 0.24 | 0.24 |
| Tolylene-2,4-diisocyanate | --------- | 1 |

CURED 75 MINUTES AT 307° F.

| $V_r$ | 0.227 | 0.333 |
|---|---|---|
| 300% Modulus, p.s.i. | 550 | 1,140 |
| Tensile, p.s.i. | 1,180 | 2,370 |
| Elongation, percent | 640 | 560 |
| Resilience, percent | 62.2 | 68.4 |
| ΔT, °F | [3] | 84 |

[1] Easy processing channel black.
[2] As in Example I; 0.6 part charged.
[3] Not determined; too soft to run test.

These data show substantial improvements in tensile and modulus for the invention in polymer reinforced with channel black. The following example shows that similar improvements can be made with the combination curative in polymer reinforced with mineral filler.

*Example IV*

The following recipe was used for preparing a butadiene/styrene random copolymer by solution polymerization:

| Butadiene | parts by weight | 75 |
|---|---|---|
| Styrene | do | 25 |
| Toluene | do | 1200 |
| Tetrahydrofuran (0.1% hydroquinone) | do | 1.0 |
| n-Butyllithium | do | 0.17 |

Shortstop: water.
Antioxidant: Phenyl-beta-naphthylamine, p.h.r. 2.0
Temperature, °F 86

The same procedure was employed as described in Example I. The polymer had a Mooney value (ML-4 at 212° F.) of 24, an inherent viscosity of 1.48, and was gel free. It was compounded using Dixie Clay as the filler (a hard-type, white-to-cream colored aluminum silicate; sp. gr. 2.60) and either dicumyl peroxide or a mixture of dicumyl peroxide and tolylene-2,4-diisocyanate as the curative. Details of the runs were as follows:

|  | Parts by Weight | |
|---|---|---|
|  | 1 | 2 |
| Butadiene/styrene copolymer | 100 | 100 |
| Dixie Clay | 50 | 50 |
| Dicumyl peroxide [1] | 0.24 | 0.24 |
| Tolylene-2,4-diisocyanate | --------- | 2 |

CURED 75 MINUTES AT 307° F.

| 300% Modulus, p.s.i. | ------ | 730 |
|---|---|---|
| Tensile, p.s.i. | 280 | 770 |
| Elongation, percent | 190 | 320 |
| Shore hardness | 45 | 49 |
| Resilience, percent | 61.4 | 77.0 |
| ΔT, °F | [2] | 33.8 |

[1] As in Example I; 0.6 part charged.
[2] Not determined; too soft to run test.

*Example V*

The butadiene/styrene random copolymer of Example IV was compounded as follows:

|  | Parts by Weight | |
|---|---|---|
|  | 1 | 2 |
| Butadiene/styrene copolymer | 100 | 100 |
| Philblack O | 50 | 50 |
| Dicumyl peroxide [1] | 0.24 | 0.24 |
| Naphthalene-1,5-diisocyanate | --------- | 1.5 |

CURED 30 MINUTES AT 307° F.

| 300% Modulus, p.s.i. | 750 | 1,170 |
|---|---|---|
| Tensile, p.s.i. | 970 | 1,600 |
| Elongation, percent | 390 | 410 |
| Shore hardness | 62 | 63 |
| Resilience, percent | 58.7 | 59.9 |
| ΔT, °F | 134.6 | 101.2 |

CURED 75 MINUTES AT 307° F.

| 300% Modulus, p.s.i. | 1,010 | ------ |
|---|---|---|
| Tensile, p.s.i. | 1,520 | 1,710 |
| Elongation, percent | 470 | 290 |
| Shore hardness | 63 | 68 |
| Resilience, percent | 61.9 | 63.3 |
| ΔT, °F | 83.6 | 72.6 |

[1] As in Example I; 0.6 part charged.

In these runs naphthalene-1,5-diisocyanate is shown to be effective in improving tensile, modulus and heat build-up, particularly in the polymer cured to a lower degree.

In the following Examples VI–X, the advantages of our invention are illustrated in connection with emulsion polymerized butadiene-styrene copolymer, natural rubber, and monoolefin polymers such as polyethylene and ethylene-propylene copolymer.

*Example VI*

A butadiene/styrene copolymer prepared by emulsion polymerization at 41° F. and having a Mooney value (ML-4 at 212° F.) of 52 and a bound styrene content of 23.5 percent, was compounded as follows:

|  | Parts by Weight | |
|---|---|---|
|  | 1 | 2 |
| Butadiene/styrene copolymer | 100 | 100 |
| Philblack O | 50 | 50 |
| Dicumyl peroxide [1] | 0.48 | 0.48 |
| Tolylene-2,4-diisocyanate | --------- | 2 |

CURED 30 MINUTES AT 307° F.

| 300% Modulus, p.s.i. | 1,350 | 1,560 |
|---|---|---|
| Tensile, p.s.i. | 2,710 | 2,880 |
| Elongation, percent | 530 | 500 |
| Shore hardness | 60 | 62 |
| Resilience, percent | 54.0 | 55.7 |
| ΔT, °F | 97.1 | 90.7 |

CURED 75 MINUTES AT 307° F.

| 300% Modulus, p.s.i. | 1,470 | 2,100 |
|---|---|---|
| Tensile, p.s.i. | 2,780 | 2,840 |
| Elongation, percent | 510 | 380 |
| Shore hardness | 60 | 62 |
| Resilience, percent | 55.4 | 59.1 |
| ΔT, °F | 88.4 | 74.0 |

[1] As in Example I; 1.2 parts charged.

Example VII

Hevea (natural rubber) was compounded in the following manner:

|  | Parts by Weight | |
| --- | --- | --- |
|  | 1 | 2 |
| Hevea | 100 | 100 |
| Philblack O | 50 | 50 |
| Dicumyl peroxide [1] | 0.48 | 0.48 |
| Tolylene-2,4-diisocyanate |  | 2 |
| CURED 30 MINUTES AT 307° F. | | |
| 300% Modulus, p.s.i. | 1,030 | 1,700 |
| Tensile, p.s.i. | 2,120 | 2,860 |
| Elongation, percent | 450 | 400 |
| Shore hardness | 47 | 51 |
| Resilience, percent | 63.3 | 70.9 |
| ΔT, °F | 88.0 | 59.5 |
| CURED 75 MINUTES AT 307° F. | | |
| 300% Modulus, p.s.i. | 1,300 | 2,010 |
| Tensile, p.s.i. | 2,230 | 2,950 |
| Elongation, percent | 410 | 380 |
| Shore hardness | 48 | 51 |
| Resilience, percent | 64.0 | 69.4 |
| ΔT, °F | 64.5 | 55.8 |

[1] As in Example I; 1.2 parts charged.

Example VIII

A commercial polyethylene designated as DYNH was compounded in accordance with the following formulations:

|  | Parts by Weight | |
| --- | --- | --- |
|  | 1 | 2 |
| DYNH polyethylene | 100 | 100 |
| Philblack O | 50 | 50 |
| Dicumyl peroxide [1] | 1.2 | 1.2 |
| Tolylene-2,4-diisocyanate |  | 1 |
| CURED 30 MINUTES AT 307° F. | | |
| Tensile, p.s.i. | 2,180 | 2,360 |
| Elongation, percent | 100 | 90 |
| CURED 75 MINUTES AT 307° F. | | |
| Tensile, p.s.i. | 2,210 | 2,550 |
| Elongation, percent | 90 | 100 |

[1] As in Example I; three parts charged.

Example IX

An ethylene/propylene copolymer, prepared in the presence of a triisobutylaluminum-titanium trichloride catalyst using equal parts by weight of the two olefins, had the following properties:

| | |
| --- | --- |
| Ash, percent | 0.38 |
| Inherent viscosity | 3.768 |
| Melt index | 0.23 |
| Density, gm./cc | 0.888 |

Inherent viscosity of the ethylene/propylene copolymer was determined in the following manner: One tenth gram (0.1000) of polymer was weighed in an aluminum cup and transferred to the center section of a special glass solution flask provided with a means for dissolving the polymer and filtering the solution. The flask was then placed in an oil bath maintained at 130±0.2° C. A flow of nitrogen was started through the flask and 50 milliliters of tetralin was added to the center section from a pipette. A condenser, packed with Dry Ice, was placed on the top of the flask. After the polymer was dissolved, the nitrogen flow was stopped and the solution filtered through the fritted glass plate. The viscosity of the polymer solution, and also that of tetralin, was determined in an Ostwald-Fenske viscosimeter. The time, in seconds, for the liquid level to pass from the upper to the lower mark, was determined. Inherent viscosity was calculated by dividing the solution time in seconds by the solvent time in seconds.

Melt index was determined by ASTM method D1238-57T. It is defined as the grams of polymer extruded in 10 minutes through an 0.0825-inch orifice at 190° C. when subjected to a load of 2160 grams. The polymer was allowed to extrude 5 minutes. The extruded material was cut off and discarded. Samples of extrudate were then collected for each two-minute period until five consecutive cuts were obtained. They were cooled, weighed, and the melt index obtained by multiplying the average value by 5.

The sample used for the density determination was compression molded. It was melted and cooled under pressure, the rate of cooling being 20–50° F. per minute. Density was determined by placing a pea-sized specimen of the polymer in a 50-milliliter, glass-stoppered graduate. Carbon tetrachloride and methylcyclohexane were added to the graduate from burettes in proportions such that the specimen was suspended in the solution. The graduate was shaken during addition of the liquids to secure thorough mixing. When the mixture just suspended the specimen, a portion of the liquid was transferred to a small test tube and placed on the platform of a Westphal balance and the glass bob lowered therein. When the temperature shown by the thermometer in the bob was in the range of 73–78° F., the balance was adjusted until the pointer was at zero and the value on the scale was read.

The ethylene/propylene copolymer was compounded in a series of recipes using dicumyl peroxide alone as the curative or a mixture of the peroxide and a diisocyanate. The stocks were mixed on a roll mill at 260° F. The following table shows the recipes and the results of tensile strength and elongation determinations after curing 60 minutes at 307° F.:

| Run No. | Philblack A [1], phr. | Dicumyl Peroxide [2], phr. | Diisocyanate | | Tensile p.s.i. | Elongation, percent |
| --- | --- | --- | --- | --- | --- | --- |
|  |  |  | Type | phr. |  |  |
| 1 | 50 | 0.4 |  |  | 1,300 | 110 |
| 2 | 50 | 0.8 |  |  | 1,310 | 110 |
| 3 | 50 | 0.4 | naphthalene-1,5-diisocyanate. | 1 | 1,480 | 230 |
| 4 | 50 | 0.4 | do | 2 | 1,650 | 260 |
| 5 | 50 | 0.2 | do | 0.5 | 1,800 | 70 |
| 6 | 50 | 0.2 | do | 1 | 1,420 | 80 |
| 7 | 50 | 0.2 | do | 1.5 | 1,500 | 180 |
| 8 | 50 | 0.4 | diphenylmethane-4,4'-diisocyanate. | 1 | 1,480 | 260 |
| 9 | 50 | 0.4 | tolylene-2,4-diisocyanate. | 1 | 1,500 | 160 |

[1] Fast extruding furnace black.
[2] As in Example I. Amounts charged as follows: one part in runs 1, 3, 4, 8, 9; 2 parts in run 2; 0.5 part in runs 5, 6, 7.

The uncured composition in run 1 had a tensile strength of 1260 p.s.i. and an elongation of 130 percent. Substantially no effect was obtained upon curing. Increasing the amount of dicumyl peroxide likewise had no noticeable effect on the curing, as shown in run 2. All stocks cured when a diisocyanate was present in the composition in addition to the peroxide, as evidenced by the increase in tensile strength.

Example X

The ethylene/propylene copolymer of Example IX was compounded as follows:

|  | Parts by Weight | |
| --- | --- | --- |
|  | 1 | 2 |
| Ethylene/propylene copolymer | 100 | 100 |
| Philblack O | 67.5 | 67.5 |
| Dicumyl peroxide [1] | 0.4 | 0.4 |
| Naphthalene-1,5-diisocyanate |  | 1 |

CURED 60 MINUTES AT 307° F.

| | | |
|---|---|---|
| Tensile, p.s.i. | 1,760 | 2,330 |
| Elongation, percent | 90 | 60 |

[1] As in Example I; one part charged.

*Example XI*

A rubbery butadiene/styrene copolymer was prepared in accordance with the following recipe:

| | |
|---|---|
| Cyclohexane, grams | 780 |
| Butadiene, grams | 77 |
| Styrene, grams | 23 |
| 1,2-dilithio-1,2-diphenylethane, millimoles [1] | 1.4 |
| Tetrahydrofuran, grams | 1.5 |
| Temperature, ° C. | 50 |
| Time, hours | 50 |
| Conversion | Quantitative |

[1] Prepared by reacting lithium wire with 1,2-diphenylethane (trans-stilbene) in a 9:1 volume mixture of diethyl ether and tetrahydrofuran.

Polymerization was effected in 32-ounce bottles. Cyclohexane was charged first followed by a 5-minute nitrogen purge. The butadiene and styrene were added, then the tetrahydrofuran, and finally the 1,2-dilithio-1,2-diphenylethane. A pressure of 25 p.s.i. nitrogen was maintained in the bottles during polymerization.

After a 2-hour polymerization period, 28 millimoles of ethylene oxide was introduced and the temperature was held at 50° C. for 68 hours. The reaction mixture was acidified with hydrochloric acid, washed with water until neutral, and the polymer was coagulated with isopropanol. One percent by weight of phenyl-beta-naphthylamine was worked into the polymer after which it was dried, first in an air oven and then in a vacuum oven. The hydroxy-containing polymer had a Mooney value (ML–4 at 212° F.) of 28.4. It was compounded in accordance with the following recipes:

| | Parts by weight | | | | | | | | |
|---|---|---|---|---|---|---|---|---|---|
| | 1 | 2 | 3 | 4 | 5 | 6 | 7 | 8 | 9 |
| Hydroxy-containing polymer | 100 | 100 | 100 | 100 | 100 | 100 | 100 | 100 | 100 |
| Philblack O | 50 | 50 | 50 | 50 | 50 | 50 | 50 | 50 | 50 |
| Dicumyl peroxide | 0.6 | | 0.6 | | 0.6 | | 0.6 | | 0.6 |
| Tolylene-2,4-diisocyanate | | 1.0 | 1.0 | | | | | | |
| Polyaryl polyisocyanate (PAPI I) | | | | 1.0 | 1.0 | | | | |
| Diphenylmethane diisocyanate | | | | | | 1.4 | 1.4 | | |
| 1,5-Naphthalene diisocyanate | | | | | | | | 1.2 | 1.2 |

The stocks were cured 30 minutes at 307° F. Results of determinations of physical properties are as follows:

| Recipe | 300% Modulus, p.s.i. | Tensile, p.s.i. | Elongation, percent |
|---|---|---|---|
| 1. Dicumyl peroxide | 800 | 1,680 | 570 |
| 2. Tolylene-2,4-diisocyanate | | 220 | 110 |
| 3. Dicumyl peroxide+diisocyanate | 1,720 | 2,670 | 450 |
| 4. Polyaryl polyisocyanate (PAPI I) | 500 | 500 | 300 |
| 5. Dicumyl peroxide+PAPI I | 3,010 | 3,570 | 350 |
| 6. Diphenylmethane diisocyanate | | 310 | 220 |
| 7. Dicumyl peroxide+diisocyanate | 2,290 | 3,240 | 420 |
| 8. 1,5-Naphthalene diisocyanate | | 360 | 260 |
| 9. Dicumyl peroxide+diisocyanate | 2,080 | 3,040 | 430 |

The above data show a pronounced synergistic effect for the organic peroxide and polyisocyanate in combination for curing polymers containing terminal hydroxy groups. The advantages of the invention as applied to such terminally reactive polymers are further illustrated in the following examples.

*Example XII*

Rubbery polybutadiene was prepared in accordance with the following recipe:

| | |
|---|---|
| Butadiene, parts by weight | 100 |
| Cyclohexane, parts by weight | 780 |
| 1,2-dilithio-1,2-diphenylethane, mmoles | 1.8 |
| Temperature, ° C. | 50 |
| Time, hours | 4 |

After a 4-hour polymerization period, 36 mmoles of ethylene oxide was added and the mixture was stirred for 2 hours while the temperature was held at 120° C. It was then acidified with hydrochloric acid, washed with water, and the polymer was coagulated with isopropanol and dried in a vacuum oven. A control polymer (no ethylene oxide) was made for comparative purposes. Results of inherent viscosity, gel, and Mooney determinations (ML–4 at 212° F.) were as follows:

| | Inherent Viscosity | Gel, percent | ML–4 |
|---|---|---|---|
| Control | 1.49 | 0 | .5 |
| Ethylene oxide treated polymer | 1.31 | 0 | 5 |

The hydroxy-containing polymer was compounded in accordance with the following recipe:

| | Parts by weight |
|---|---|
| Hydroxy-containing polymer | 100 |
| Philblack O | 50 |
| Dicumyl peroxide [1] | 0.36 |

[1] Used as 40 weight percent dicumyl peroxide supported on calcium carbonate. Amount of this material used was 0.9 part.

The stocks were cured 30 minutes at 307° F. and physical properties determined. Results were as follows:

| Additional Curative | | Tensile, p.s.i. | Elongation, percent | Resilience, percent | ΔT, ° F. |
|---|---|---|---|---|---|
| Type | phr. | | | | |
| | | 1,580 | 210 | 67.8 | 73.3 |
| PAPI | 1.0 | 1,900 | 130 | 87.1 | 27.0 |
| TDI [1] | 1.0 | 1,730 | 170 | 81.9 | 43.6 |

[1] Tolylene-2,4-diisocyanate.

As shown above, the addition of the polyisocyanate as well as the organic peroxide gives better tensile strength and substantially improved heat build-up in the cured terminally reactive polymer.

*Example XIII*

Butadiene was copolymerized with styrene in accordance with the following recipe:

| | |
|---|---|
| Butadiene, parts by weight | 77 |
| Styrene, parts by weight | 23 |
| Cyclohexane, parts by weight | 1200 |
| 1,2-dilithio-1,2-diphenylethane, mmoles | 1.3 |
| Tetrahydrofuran, parts by weight | 1.5 |
| Temperature, ° C. | 50 |
| Time, hours | 2 |

Cyclohexane was charged to the reactor which was then purged with nitrogen, tetrahydrofuran was added followed by butadiene, styrene, and 1,2-dilithio-1,2-diphenylethane. After a 2-hour polymerization period, 30 mmoles of ethylene oxide was added and the temperature was maintained at 50° C. for 60 hours. Dilute hydrochloric acid was added, the mixture was washed with water, and the polymer was coagulated with isopropanol and dried in a vacuum oven.

The hydroxy-containing polymer was compounded using the following recipe:

| | Parts by weight |
|---|---|
| Hydroxy-containing polymer | 100 |
| Philblack O | 50 |
| Dicumyl peroxide [1] | 0.24 |

[1] Used as 40 weight percent dicumyl peroxide supported on calcium carbonate. Amount of this material used was 0.6 part.

Variable quantities of tolylene-2,4-diisocyanate and PAPI 1 were added to the rubber stocks, compounded as described above. All rubber compounds were cured 30 minutes at 307° F. and physical properties determined. Results were as follows:

| Additional Curative | | 300% Modulus | Tensile, p.s.i. | Elongation, percent | Resilience, percent | $\Delta T$, ° F. | Shore Hardness |
|---|---|---|---|---|---|---|---|
| Type | phr. | | | | | | |
|  |  | 1,360 | 2,140 | 460 | 67.6 | 78.4 | 67 |
| TDL | 1 | 2,970 | 3,360 | 340 | 73.7 | 50.3 | 71 |
| TDL | 1.5 |  | 2,970 | 290 | 76.8 | 44.6 | 73 |
| TDL | 2.5 |  | 2,760 | 250 | 77.4 | 42.6 | 74 |
| PAPI 1 | 1 | 2,440 | 2,510 | 300 | 74.6 | 54.7 | 70 |
| PAPI 1 | 1.5 |  | 2,910 | 280 | 78.2 | 41.5 | 72 |
| PAPI 1 | 2.5 |  | 2,900 | 270 | 80.7 | 38.1 | 72 |

The above data show that the hydroxy-containing butadiene-styrene copolymer, which had a 46-Mooney value (ML–4 at 212° F.) was cured according to our invention to obtain higher tensile, modulus and hardness and lower heat build-up.

Tensile strength and elongation determinations for the above examples were made using an Instron tensile machine operated at a crosshead speed of 20 inches per minute. The polymers were compounded on a roll mill and the compositions sheeted off the mill to a thickness of approximately 0.050 inch and cured in a slab mold at the temperature and for the time specified in the examples. Dumbbell test specimens were died out of the cured sheets.

As will be evident to those skilled in the art, various modifications of this invention can be made, or followed, in the light of the foregoing disclosure and discussion, without departing from the spirit or scope thereof.

We claim:

1. A method of curing a compounded stock to form a solid product which comprises compounding into a solid mixture 100 parts by weight of polymeric material selected from the group consisting of natural rubber and synthetic polymer of monomer selected from the group consisting of conjugated dienes containing from 4–12 carbon atoms per molecule and monoolefins containing 2–8 carbon atoms per molecule, a reinforcing amount of a reinforcing material selected from the group consisting of carbon black and mineral filler, from 0.05 to 5 parts by weight of an organic peroxide having the formula R'—O—O—R', wherein each R' is selected from the group consisting of alkyl, cycloalkyl, aryl, alkaryl, aralkyl and acyl radicals containing from 1 to 15 carbon atoms and from 0.1 to 5 parts by weight of a polyisocyanate having the formula $R(NCO)_m$, wherein R is a polyvalent organic radical and m is an integer of 2 to 4, and heating said mixture sufficiently to react said polymeric material, peroxide, and polyisocyanate and produce a cured, solid product.

2. The process of claim 1 wherein said polymeric material is polybutadiene.

3. The process of claim 1 wherein said polymeric material is a copolymer of butadiene and styrene.

4. The process of claim 1 wherein said polymeric material is polyethylene.

5. The process of claim 1 wherein said polymeric material is a copolymer of ethylene and propylene.

6. The process of claim 1 wherein said polymeric material is a synthetic polymer containing terminal hydroxy groups.

7. The process of claim 1 wherein said organic peroxide is dicumyl peroxide.

8. The process of claim 1 wherein said organic peroxide is ditert-butylperoxide.

9. The process of claim 1 wherein said polyisocyanate is tolylene-2,4-diisocyanate.

10. The process of claim 1 wherein said polyisocyanate is a compound having an average of 3 isocyanate groups, an average molecular weight of about 380 and the general formula

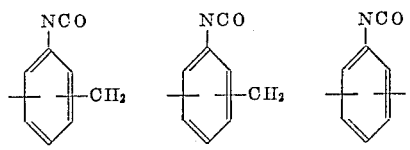

11. The process of claim 1 wherein said polymeric material is a polymer of butadiene containing terminal hydroxy groups.

12. The process of claim 1 wherein said polymeric material is a natural rubber.

13. The process of claim 1 wherein said polymeric material is an ethylene polymer.

14. The composition prepared by the process of claim 1.

15. The composition prepared by the process of claim 6.

16. The composition prepared by the process of claim 13.

17. A method of curing a compounded stock to form a solid product which comprises compounding into a solid mixture 100 parts by weight of a polymer having the formula $AY_n$ wherein A comprises a polymer of conjugated dienes containing from 4–12 carbon atoms per molecule, Y is a terminal hydroxy group, and n is an integer of at least 1, a reinforcing amount of a reinforcing agent selected from the group consisting of carbon black and mineral filler, from 0.05 to 5 parts by weight of an organic peroxide having the formula R'—O—O—R', wherein each R' is selected from the group consisting of alkyl, cycloalkyl, aryl, alkaryl, aralkyl and acyl radicals containing from 1 to 15 carbon atoms and from 0.1 to 5 parts by weight of a polyisocyanate having the formula $R(NCO)_m$, wherein R is a polyvalent organic radical and m is an integer of 2 to 4, and heating said mixture sufficiently to react said polymer, peroxide and polyisocyanate and produce a cured, solid product.

18. The method of claim 17 wherein said polymer is polybutadiene containing two terminal hydroxy groups per molecule, said organic peroxide is dicumyl peroxide and said polyisocyanate is tolylene-2,4-diisocyanate.

19. The method of claim 17 wherein said polymer is a copolymer of butadiene and styrene containing two hydroxy groups per molecule, said peroxide is dicumyl peroxide and said polyisocyanate is diphenylmethane diisocyanate.

20. A method of curing a compounded stock to form a solid product which comprises compounding into a solid mixture 100 parts by weight of a polymer of mono-1-olefin containing from 2–8 carbon atoms per molecule, a reinforcing amount of a reinforcing agent selected from the group consisting of carbon black and mineral filler, from 0.05 to 5 parts by weight of an organic peroxide having the formula R'—O—O—R', wherein each R', is selected from the group consisting of alkyl, cycloalkyl, aryl, alkaryl, aralkyl and acyl radicals containing from 1 to 15 carbon atoms and from 0.1 to 5 parts by weight of a polyisocyanate having the formula $R(NCO)_m$, wherein R is a polyvalent organic radical and m is an integer of 2 to 4, and heating said mixture sufficiently to react said polymer, peroxide and polyisocyanate and produce a cured, solid product.

21. The method of claim 20 wherein said polymer is an ethylene-propylene copolymer.

22. The method of claim 20 wherein said polymer is polyethylene.

References Cited in the file of this patent

UNITED STATES PATENTS

| | | |
|---|---|---|
| 2,826,570 | Ivett | Mar. 11, 1958 |
| 2,877,212 | Seligman | Mar. 10, 1959 |
| 2,886,467 | Lavanchy et al. | May 12, 1959 |

FOREIGN PATENTS

| | | |
|---|---|---|
| 754,514 | Great Britain | Aug. 8, 1956 |